United States Patent
Yip et al.

(10) Patent No.: US 9,237,017 B2
(45) Date of Patent: Jan. 12, 2016

(54) LIGHTWEIGHT AUTHENTICATION FOR ON-PREMISE RICH CLIENTS

(75) Inventors: Chun Pong Yip, Hong Kong (CN); Wing Wai Wong, Hong Kong (CN); Chun Yam Kwok, Hong Kong (CN); Houman Pournasseh, Bellevue, WA (US); Dean L. Fulcer, III, Federal Way, WA (US); Rerkboon Suwanasuk, Kirkland, WA (US); Chor Ki Ng, Hong Kong (CN); Bjorn Christian Rettig, Redmond, WA (US); Chung Yiu Chow, Hong Kong (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 13/052,469

(22) Filed: Mar. 21, 2011

(65) Prior Publication Data

US 2012/0246709 A1 Sep. 27, 2012

(51) Int. Cl.
*H04L 9/32* (2006.01)
*H04L 29/06* (2006.01)

(52) U.S. Cl.
CPC .......... *H04L 9/3226* (2013.01); *H04L 63/0815* (2013.01); *H04L 63/0861* (2013.01)

(58) Field of Classification Search
CPC . H04L 67/02; H04L 63/0815; H04L 63/0884; H04L 9/3226; H04L 63/0861
USPC .......................................................... 726/8
See application file for complete search history.

(56) References Cited

U.S. PATENT DOCUMENTS

| | | | |
|---|---|---|---|
| 6,763,459 B1 | 7/2004 | Corella | |
| 7,328,344 B2 | 2/2008 | Chang | |
| 7,356,694 B2 * | 4/2008 | Mayo et al. | 713/159 |
| 7,814,533 B2 | 10/2010 | Devine et al. | |
| 2002/0199001 A1 | 12/2002 | Wenocur et al. | |
| 2003/0145205 A1 | 7/2003 | Sarcanin | |
| 2007/0214272 A1 | 9/2007 | Isaacson | |
| 2007/0282965 A1 * | 12/2007 | Kataoka | 709/213 |
| 2008/0016227 A1 | 1/2008 | Holden et al. | |
| 2009/0119759 A1 * | 5/2009 | Taugbol | 726/6 |
| 2009/0276835 A1 | 11/2009 | Jackson | |
| 2009/0293102 A1 | 11/2009 | Klein | |

OTHER PUBLICATIONS

Jrstad, I. et al, "Releasing the potential of OpenID & SIM", in proceedings of ICIN 2009, 2009.*
Microsoft Dynamics CRM SDK Version 4.0.12, May 2010, Server-to-Server Authentication with Impersonation.*
(Continued)

*Primary Examiner* — Saleh Najjar
*Assistant Examiner* — Oleg Korsak
(74) *Attorney, Agent, or Firm* — Sandy Swain; Judy Yee; Micky Minhas

(57) ABSTRACT

Lightweight authentication for on-premise rich clients is described. The lightweight authentication mitigates the amount of software that is installed on a client machine for authentication purposes. A portion of an external website is hosted on an application executing on the rich client. The user can interact with the portion of the external website in order to enter credentials or other identification information. The entry of the credentials or other identification information is relayed to the external website for verification. If the verification is successful, the user can interact with various external websites utilizing the single verification.

20 Claims, 12 Drawing Sheets

(56) References Cited

OTHER PUBLICATIONS

Phani Raju "Using the ADO.NET Data Services Silverlight client library in x-domain and out of browser scenarios—II", Sep. 9, 2009, pp. 1-5. retrieved from http://blogs.msdn.com/b/phaniraj/archive/2009/09/10/ on May 1, 2014.*

Bromberg, Peter; Integrate Windows LIVE ID Authentication with ASP.NET Membership, Profiles and Roles, Dec. 20, 2010.
Server-to-Server Authentication with Impersonation; Dec. 20, 2010.
Managed PKI Service, Dec. 20, 2010.
"International Search Report", Mailed Date: Oct. 24, 2012, Application No. PCT/US2012/028907, Filed Date: Mar. 13, 2012, pp. 11.

* cited by examiner

LIGHTWEIGHT AUTHENTICATION FOR ON-PREMISE RICH CLIENTS

TECHNICAL FIELD

The subject disclosure generally relates to authentication mechanisms that support rich client applications while mitigating complicated dependency and installation of components on the rich client.

BACKGROUND

As computing technology advances and computing devices become more prevalent, computer programming techniques have adapted for the wide variety of computing devices in use. For instance, program code can be generated according to various programming languages to control computing devices ranging in size and capability from relatively constrained devices such as simple embedded systems, mobile handsets, and the like, to large, high-performance computing entities, such as data centers or server clusters.

Conventionally, as applications are being developed and/or modified for use with computing devices, authentication of users has typically been approached in one of two ways. The first approach is a pure on-line web-based approach where authentications occur through a mechanism referred to as "cookies". With this approach, the components and/or dependencies occur on the server side (e.g., web side) and the client side (e.g., client machine, client device) simply user a browser in order to interact with the server side. Thus, software is not installed on the client machine. However, a problem with this approach is that the authenticated session state remains open only while the browser is open. Further, this approach only works on a web application but does not work on an application running on a desktop (e.g., a rich client).

A second approach for authentication is for rich clients. In this approach, software (and complicated dependency) is downloaded and installed on the client machine. In some cases, a problem with this approach is that the software that is downloaded and installed is quite large, which can consume valuable resources on the client machine. Another problem with this approach is that due to the numerous platforms, different software components are created and made available for installation on the different client machines (depending on the supported platform). This can create numerous deployment challenges, which can reduce usability of the system and can create a negative user experience. Additionally, different software components are created and made available for installation on the client machines for different languages.

Consequently, there is no system today that properly supports an authentication mechanism that mitigates the installation of software (complicated dependency). Further, there is no system today that can allow a rich client to interact with server side components in a seamless and integrated manner.

The above-described deficiencies of today's computing system and authentication system techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, the disclosed aspects leverage on a self-developed registration portal, which bridges communications between the client side and the server side. A registration portal provides a secure communication channel, which facilitates and simplifies the user logon experience to a single sign-on service on the client side. Further, the disclosed aspects provide for an exchange of sensitive data between the client device (client side) and the web portal (server side), where the sensitive data is encrypted and communicated within a secure channel.

In accordance with some aspects, the disclosed embodiments provide single sign-on identification authentication services on the client side through a secondary web-based application. In such a manner, sensitive data between the client application and the web server is exchanged using a web browser Document Object Model (DOM or DOM object model) and Public Key Infrastructure (PKI) key exchange technology, according to an aspect.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
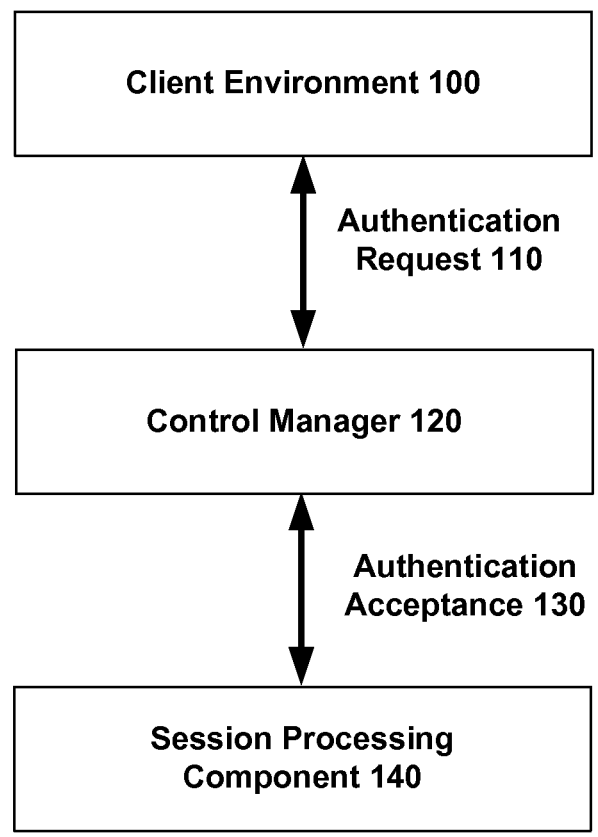
FIG. 1 illustrates a block diagram of an exemplary computing system associated with a client side application, according to an aspect.

By way of introduction, single sign-on services are provided to allow users to log onto many websites using one account. With a single sign-on service, a user logs in once and can access related but different or independent software systems without being prompted to log in again at each software system.

Conventionally, there are two distinct approaches to achieve a single sign-one service. In the first approach, a web browser is used to login to the single sign-on service site. In this approach, an authentication session token is maintained through a browser cookie. In the second approach, rich clients use a single sign-on service assistant as the authentication provider for the single sign-on service. In the second approach, a single sign-on service assistant runtime is installed on the client machine.

There are a few challenges associated with the above approaches. First, the first approach typically works for web applications only and cannot be utilized for rich clients. A challenge of the second approach is that the single sign-on service assistant is to be deployed as a portion of the deployment package, which increases download and setup time. Further, during a testing period, switches between different single sign-on environments often occur. Switching between these environments can result in an adjustment to some client machine settings, which can introduce complications during build deployment. In addition, switching between different environments does not work well under an environment with a proxy server due to potential limitations on the single sign-on service assistant runtime. Another disadvantage is that installing another component on the client machine potentially increases and complicates software patching, maintenance, and troubleshooting efforts. Thus, it would be beneficial to enable the evolution of a lightweight mechanism for a single sign-on service.

In an embodiment, a lightweight authentication mechanism mitigates a setup footprint of a rich client. A large portion of the authentication occurs on the server side, which can make testing and patching easier to implement on the client side. Further, if there is a problem, components related to the lightweight authentication mechanism are not patched on the client side. In addition, switching between different single sign-on service environments is simpler since the change is only on the server side. Thus, single sign-on service applications can be switched automatically, providing a rich user experience.

In one embodiment, an authentication system includes a rich client configured to execute one or more local applications. The authentication system also includes a control manager component configured to perform authentication with an external website. The control manager component is associated with at least one of the one or more local applications. In an aspect, the control manager component is hosted on the rich client by the external website.

In some implementations, the authentication system includes a session processing component configured to establish a secure session with the external website. The secure session is established as a function of the authentication.

In other implementations, the authentication system includes a web page control component configured to display the external website that is redirected to a single sign-on service identification. The authentication system can also include a credential component configured to create a user interface configured to receive credentials. The control manager component communicates the credentials to the external website.

Further, according to some implementations, the control manager component is visible during the authentication and is collapsed after successful authentication.

In some implementations, the authentication system includes a session processing component configured to establish a secure communication session with the external website. In other implementations, the authentication system includes a session processing component configured to scrape the external website to retrieve a shared key in response to a web page control authentication process.

In further implementations, the authentication system includes a communication component configured to exchange data with the external website using the shared key.

The control manager component is configured to perform the authentication with biometrics associated with a user of the rich client. In some implementations, the secure session is established through the use of a proxy approach.

In another embodiment is an authentication system that includes a host component configured to host a portion of a single sign-on service on a rich client. The authentication system also includes a verification processing component configured to authenticate the rich client on the single sign-on service. In some aspects, the host component can be configured to direct the rich client to a website external to the rich client.

In some implementations, the authentication system includes an access manager component that receives a credential of the rich client from the website and selectively determines if the rich client can use at least one service of the single sign-on service.

In other implementations, the authentication system includes a security manager component configured to establish and maintain a secure communication channel with the rich client after authentication.

The security manager component performs a key pair exchange with the rich client to establish the secure communication channel in some implementations. Further, the verification processing component is configured to authenticate the rich client with biometrics of a user of the rich client.

Another aspect relates to a method of establishing a secure communication channel. The method can include performing authentication with an external website. The authentication is performed though a portion of the external website hosted on an application executing on a rich client. The method can also include establishing a secure session with the external website. The secure session is established as a function of the authentication.

In one implementation, the method includes displaying the portion of the external website before the performing and collapsing the portion of the external website after the establishing.

In some implementations, the method includes displaying the external website that is redirected to a single sign-on service identification and creating a user interface configured to receive credentials. The method also includes communicating the credentials to the external website before the performing.

In further implementations, the method includes scraping the external website to obtain a shared key before the establishing.

Herein, an overview of some of the embodiments for authentication systems has been presented above. As a roadmap for what follows next, various exemplary, non-limiting embodiments and features for authentication systems are described in more detail. Then, some non-limiting implementations and examples are given for additional illustration, followed by representative network and computing environments in which such embodiments and/or features can be implemented.

Lightweight Authentication for On-Premise Rich Clients

By way of further description with respect to one or more non-limiting ways to provide an authentication, a block diagram of an exemplary computing system associated with a client side application is illustrated generally by FIG. 1. The computing system includes a client environment 100, which can be a client machine, wherein one or more applications are executing on the client machine. In accordance with some aspects, the client machine is a rich client, which has some locally installed resources but also depends on other resources distributed over a network. However, in accordance with some aspects, the client environment 100 is a different type of client machine (e.g., a thin client, a fat client, a hybrid client, and so forth).

When a user or client interacts with the client environment 100, the client may desire to authenticate with a website, for example, to access various software systems (or websites). As utilized herein a user, client, entity, or the like, can refer to a human, an actor, a computer, the Internet, a system (or another system), a commercial enterprise, a machine, machinery, and so forth, and hereinafter will be commonly referred to as user, client, or entity, depending on the context. To access such systems or websites, an authentication request 110 is created. For example, the authentication request 110 can be created when the user access a website.

A control manager 120 is configured to selectively facilitate authentication of the user with an external authentication server as a function of the authentication request 110. For example, control manager 120 is configured to solicit or gather credentials from the user and selectively provide those credentials to the external authentication server. In some aspects, the control manager 120 prompts the user for the information. In other aspects, the control manager 120 accesses a database or other storage media and obtains the information. For example, user credential information might be retained locally, based on previous user input, and used for a current authentication. However, the disclosed aspects are not so limited and various other means of obtaining user credential information can be utilized.

The control manager 120 interacts with the external authentication server to provide the user credential information. Based on the information provided, the external authentication server might deny the authentication or might approve the authentication. If the authentication is denied, a communication of the denial is provided to the control manager 120. One or more additional opportunities to provide the correct credential information can be provided.

If the external authentication server approves the authentication, an authentication acceptance 130 is received. In this situation, a session processing component 140 is configured to establish a secured session (or a secure channel) with a server (e.g., website) based on the authentication acceptance 130. Various mechanisms can be utilized by session processing component 140 to establish the secure session For example, the secure session can be established through the exchange of shared keys, a Public Key Infrastructure (PKI), the exchange of PKI data, the exchange of secret messages, the exchange of various sensitive data, a proxy approached, a RSA secure ID, and so forth.

The secure session can be utilized by the client machine in order to access and communicate with entities (server, website, and so forth) using the established authentication. The authentication and secure session can be established until the user signs off or another action occurs that indicates the secure session and/or authentication is to be discontinued.

Figure 2:
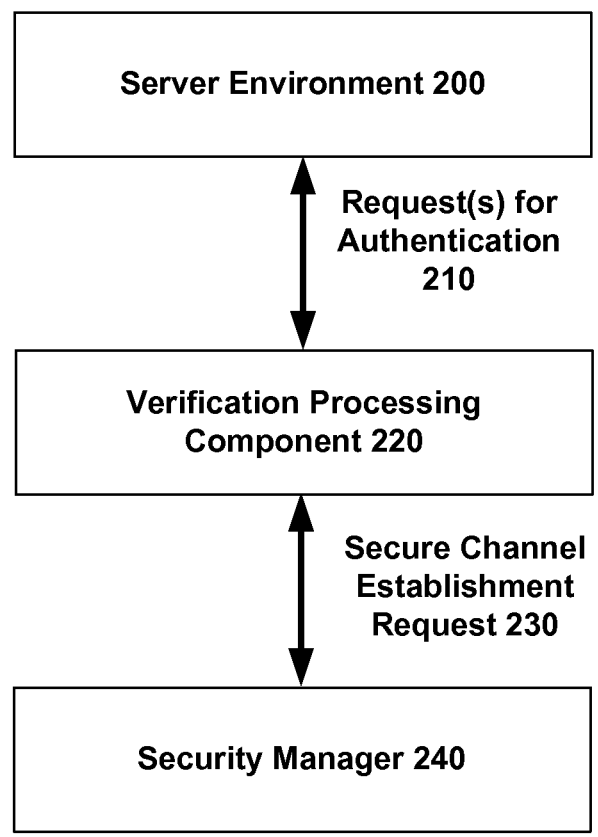
FIG. 2 illustrates another exemplary computing system associated with a server side application, according to an aspect.

FIG. 2 illustrates another exemplary computing system associated with a server side application, according to an aspect. The computing system includes a server environment 200. In an example, the server environment 200 is the Internet.

One or more requests for authentication 210 can be received, wherein each request is received from a different user. For example, a first request can be received from a first user (e.g., from control manager 120 of FIG. 1), a second request can be received from a second user, and so forth.

A verification processing component 220 is configured to determine whether each of the requests for authentication 210 are to be allowed or not allowed. For example, based on a request for authentication 210, verification processing component 220 can interact with a client device (e.g., control manager 120 of FIG. 1) to obtain user credential information. Verification processing component 220 can access a data store or other storage media to cross reference the credential information received (e.g., from control manager 120) with stored information to determine if the credential information provided is accurate. If not accurate, a denial of the authentication can be sent to the client device. If the credential information is accurate (can be verified), a notice of approval is communicated to the client device. In accordance with some aspects, the verification processing component 220 is configured to authenticate the rich client with biometrics of a user of the rich client.

After communication of the notice of approval, a secure channel establishment request 230 can be received by a security manager 240. The request can be received from the client device (e.g., control manager 120 of FIG. 1) and/or from the verification processing component 220. The security manager 240 is configured to establish and maintain a secure communication channel with the user (e.g., client device), until a sign off event occurs. Various mechanisms can be utilized by security manager 240 to establish the secure session For example, the secure session can be established through the exchange of shared keys, a Public Key Infrastructure (PKI), the exchange of PKI data, the exchange of secret messages, the exchange of various sensitive data, a proxy approached, a RSA secure ID, and so forth.

In an embodiment, the authentication systems illustrated by FIG. 1 and FIG. 2 can differ in operation from conventional authentication systems in order to provide additional benefits over those achievable by computing systems that employ conventional authentication systems. For instance, the authentication systems disclosed herein can be applied to rich clients while mitigating the setup footprint of the rich clients.

Figure 3:
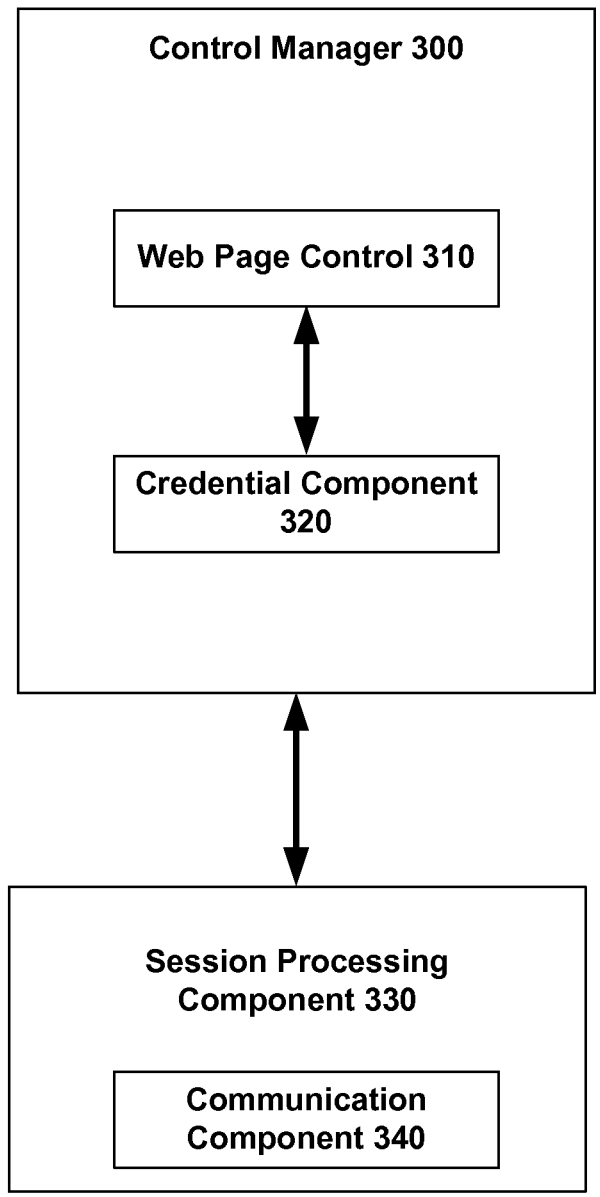
FIG. 3 is a block diagram showing a control manager component containing a web page control component and a credential component, according to an aspect.

Illustrating other aspects, FIG. 3 is a block diagram showing a control manager component 300 containing a web page control component 310 and a credential component 320. In one embodiment, the control manager component 300 is hosted on a rich client by an external website. The rich client is configured to execute one or more local applications. The control manager component 300 is configured to perform authentication with an external website. In an aspect, the control manager component 300 is associated with at least one on the one or more local applications.

The web page control component 310 is configured to allow the client device to interact with a web-based application. For example, the web page control component is configured to display the external website that is redirected to a single sign-on service identification. The web page control component 310 provides access to the web-based application and also allows the client device to seamlessly interact with the web-based application. For example, the web page control component 310 is configured to display a web page that is redirected to a single sign-on service identification.

The credential component 320 is configured to create a user interface the receives credentials. The control manager component 300 can communicate the credentials to the external website. In accordance with some aspects, the credential component 320 allows the user to input credentials, such as a user name/password pair. The input can be applied directly into the user interface and communicated to the single sign-on service. The user is authenticated (or not authenticated) as a function of the single sign-on service parameters. For example, the single sign-on service identification can comprise tokens that authenticate to host the web application that authenticates users according to the web application. This occurs on the web application (server side) but appears to the user as if it is occurring on the client device (client side). In accordance with some aspects, the input is automatically retrieved (e.g., from a data store) and applied.

After authentication, a session processing component 330 is configured to establish a secure session with the external website in order to exchange data securely with the web application (e.g., continue the communication). The secure session can be established as a function of the authentication.

In accordance with some aspects, the session processing component 330 can scrape an external website created by an authentication server in response to web page control authentication process. By scraping the website, the session processing component 330 retrieves a shared key. The client device can use the shared key to communicate with the server and therefore can communicate in an authenticated and secure manner. The session processing component 330 can comprise a communication component 340 configured to exchange data with the external website using the shared key.

In accordance with some aspects, the rich client can be leveraged to authenticate a user utilizing biometrics. Thus, the control manager component 300 is configured to perform the authentication with biometrics associated with a user of the rich client. For example, data related to a thumbprint or facial recognition can be obtained. This data can be pointed back to the web page through a secure web application to perform the authentication. Based on the authentication, a token can be provided to the rich client, which can be utilized to establish the secure session.

For example, providing the thumbprint (or other biometric) can drive the web application, which can respond with an encrypted token that scrapes back to the rich client application to establish a secure communication channel. Thus, it is delegating the verification part of the verification to the web application side and the rich client takes care of data collection for authentication.

In accordance with some aspects, the authentication can be a RSA secure ID. In this approach, the user types in a password and there is some randomly generated number that changes, which the user would combine with the password to perform the authentication. Based on the input of the password and number pair, the user can be authenticated and a secure token can be generated in order to secure the connection.

In accordance with some aspects, at about the same time as authentication is complete, the web control is collapsed or hidden from view. Thus, the control manager component 300 is visible during the authentication and is collapsed after successful authentication. Although the web control is collapsed, the state is maintained. According to some aspects, the key remains on the page and in a subsequent step, the key is scraped from the page. For example, shortly after the user types in the password, the page in which the password is entered is collapsed or removed from view. Subsequently, the key is scraped from the website and a secure communication path is established. The page can be collapsed in order to not distract the user. Further details related to the authentication will be provided below with reference to FIG. 4.

Figure 4:
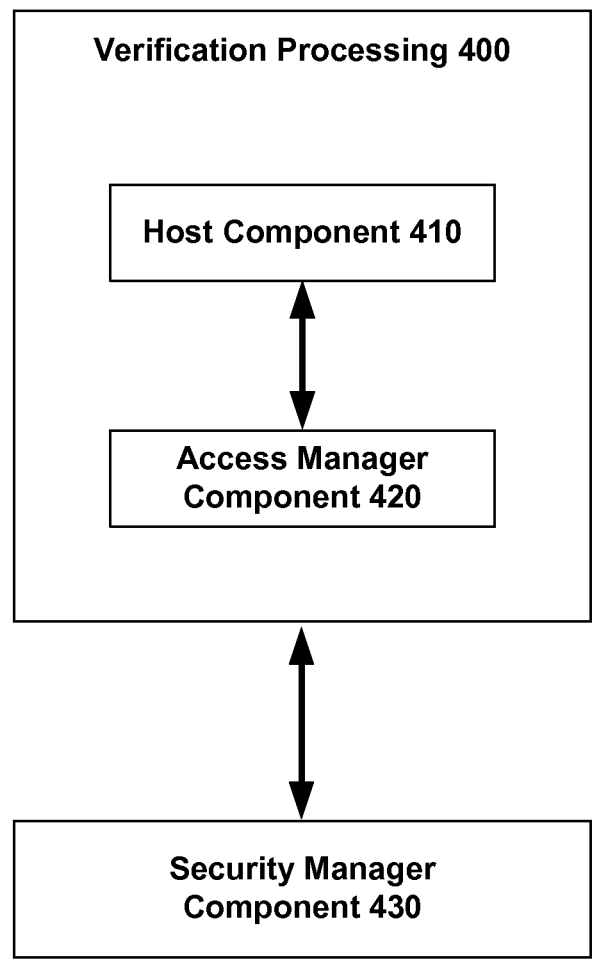
FIG. 4 is a block diagram showing a verification processing component containing a host component and an access manager component, according to an aspect.

Illustrating other aspects, FIG. 4 is a block diagram showing a verification processing component 400 containing a host component 410 and an access manager component 420, according to an aspect. The host component 410 is configured to host a portion of a website (or a portion of a single sign-on service) on an application executing locally in a rich client. The portion of the website allows the website to direct the user (e.g., rich client) to a website in order to obtain credential information to establish authentication with a single sign-on service.

The access manager component 420 is configured to receive the credentials and determine whether a user of the rich device is to be authenticated and allowed to use services of the single sign-on service. For example, the access manager component 420 can retrieve data associated with the user credentials from a data store and compare the retrieved data to the data received from the rich client. If the comparison reveals that the data does not match the credential information, access is denied. If the data matches the credential information, access is allowed.

In accordance with some aspects, at about the same time as access is allowed (e.g., user is authenticated), the host component 410 is collapsed or is removed from view on the rich client. In an example, the host component 410 can be viewed by a user of the rich client (e.g., appears to the user as the web page control component 310 of FIG. 3).

After authentication, a security manager component 430 is configured to establish and maintain a secure communication channel with the user (e.g., client device, rich client), until a sign off event occurs. In an example, the security manager component 430 performs a key pair exchange with the rich client to establish the secure communication channel.

With reference now to FIGS. 3 and 4, when authentication is completed, an encrypted shared credential between the server side and the client side is created (similar to a shared key). Therefore, at about the same time as the web application is authenticated, a shared key is created and encrypted and rendered to the user though the web page. For example, the session processing component can scrape the web page and retrieve the key from the web page. Thus, the session processing component scrapes an external website created by authentication server in response to web page control authentication process to retrieve the shared key. The client side can use the shared key to communicate with the server and therefore the communication is occurring over a secure channel. After the scrape, it is the rich client (e.g., client device) that is using the shared key.

This allows the client device to continue to piggyback on a state mechanism identification because it is a single sign on mechanism. Therefore, the user can utilize the same password and leverage the mechanism to purely authenticate the user through a mechanism of single sign-on service authentications. From then on, the shared key mechanism is leveraged to continue the authentication sessions.

In accordance with some aspects, establishing the secured session is based on a shared key or another approach. For example, establishing the secure session can include PKI, exchanging PKI data, exchanging secret messages, exchanging any kind of sensitive data, and so on.

According to some aspects, a proxy approach is utilized to establish the secure session. For example, a middle man can be utilized to communicate between the rich client and the server without deploying client pieces on the client device. The middle man can use a channel to exchange information between the server and the client. According to some aspects, a middle man can utilize a footprint associated with the client device. In an aspect, the middle man is located with the operating system of the client device and/or on the server side.

According to some aspects, the client device can generate a key pair (private key/public key) on the fly (or at runtime) and transmit the public key to the sever or to the webpage. The public key can be transmitted over a secure channel on the webpage on the client. The server can take the key and encrypt a secret and render the secret to the client device. Then the client device can scrape the secret from the webpage. Since the client device held the private key, only the client device can decrypt the secret, which can make the process more secure. Both the server and client share the same secret and establish a secure communication channel.

Conceptually, there are two channels, a web application channel and a rich client channel. The secure secret can be established though the rich client channel. To establish that, it is piggybacked on the web application channel so a component is not downloaded on the client devices to perform complicated cryptographic exchange to establish the secure channel.

As a non-limiting example for overcoming limitations of conventional authentication systems, FIGS. 5 through 8 illustrate a non-limiting example of a detail flow for a lightweight authentication mechanism for a single sign-on service, according to an aspect. According to some aspects, the disclosed aspects can leverage a web browser Document Object Model (DOM object model or DOM) and Public Key Infrastructure (PKI) key exchange technologies to provide both a lightweight authentication broker, and a platform with extended functionality for confidential message exchange. Through utilization of the disclosed aspects, a user can enjoy a seamless user experience as if the client device is running on the rich client application. Additionally, the disclosed aspects can allow sensitive messages to be exchanged between a web server and on-premise rich clients on a secure channel throughout the single sign-on service authenticated session.

The aspects disclosed in FIGS. 5 through 8 utilize a "Repair Center" as an example to illustrate the detail flow. The Repair Center solution is a solution that provides a unifying and integrated experience for users to troubleshoot and resolve issues they may experience when using various platforms. The Repair Center aims to provide both proactive and reactive support to users.

According to an example, the Repair Center comprises both client side technologies, an Application (Repair Center client), web-based technologies, and a web portal (Repair Center portal). Repair Center client provides local analytic and troubleshooting capabilities for users, which can help diagnose and fix issues on user machines. The Repair Center portal can aggregate the troubleshooting results executed on the user machines, and can provide an integrated support experience targeted to the issues associated with the user machines. In order to provide a single and centralized sign-on experience to a user while the user is accessing the Repair Center and other web sites, the Repair Center can use a single sign-on service as the authentication channel.

Traditionally, single sign-on service authentication might depend on a single sign-on service assistant, which is a service that is installed on each individual user machine. Dependence on this service means that the Repair Center deploys the single sign-on service identification sign-in assistant as part of deployment. The drawback of this dependency is that it not only can increase the deployment time but also can complicate the ongoing testing, maintenance and troubleshooting effort. Instead of relying on the traditional single sign-in assistant runtime for clients to authenticate against, the Repair Center uses a light-weight authentication mechanism for performing single sign-on identification authentication without relying on the above runtime.

The detail flow of FIGS. 5-8 outlines how a single sign-on service authentication according to the disclosed aspects can be achieved for on-premise rich client applications. Further, the detail flows illustrate how sensitive data is encrypted and exchanged throughout the single sign-on authentication session by using PKI key exchange technologies. The following message flows are running on Secure Sockets Layer (SSL) protocol, which provides a secure transport layer for message exchange between the client device and the web server. However, it is noted that other types of authentication and/or protocol can be utilized with the disclosed aspects.

Figure 5:
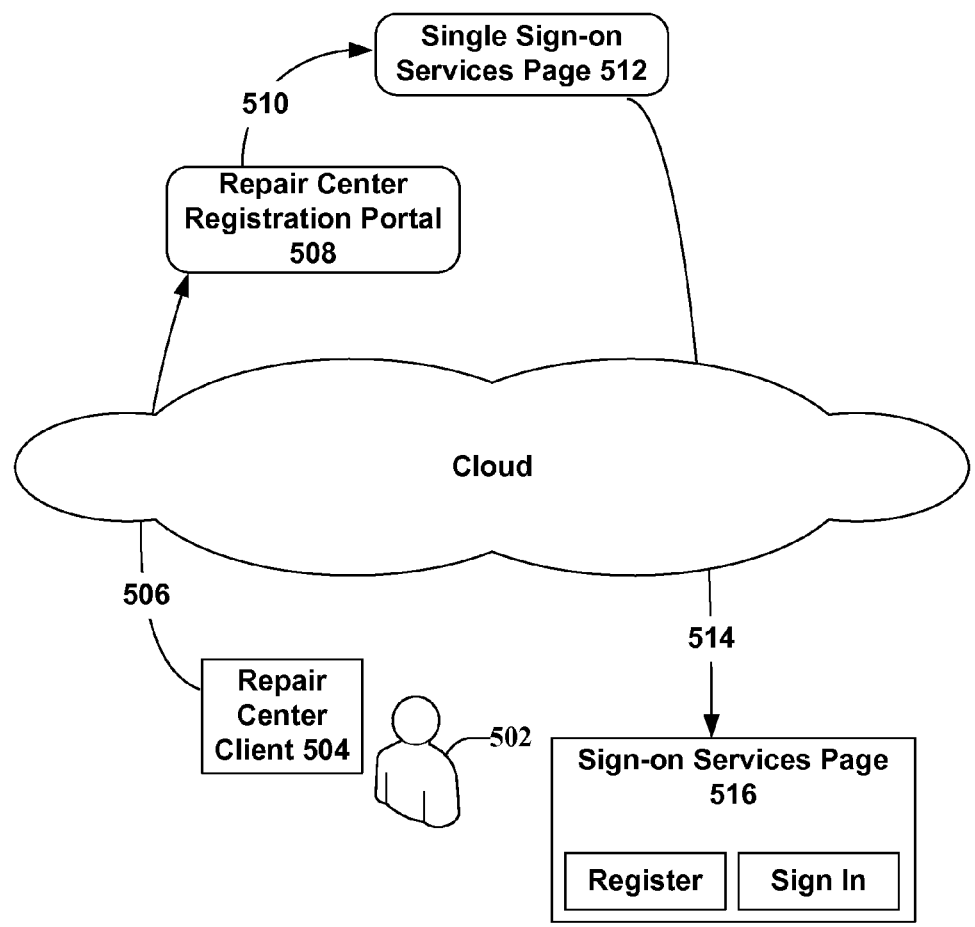
FIG. 5 illustrates a non-limiting example of a simple flow for a single sign-on service within an on-premise rich client, according to an aspect.

With initial reference to FIG. 5, illustrated is a non-limiting example of a simple flow for a single sign-on service within an on-premise rich client, according to an aspect. A user 502 (depicted as a representation of a human) installs a repair center client 504 and executes a setup program. During setup, the user can choose to create a repair center online account that links with the user's single sign-on service identification. At this point, repair center client 504 launches a control, at 506, which embeds the web browser within the client application. This control launches a repair center registration portal 508 sign in page, which directs the user to the single sign-on services site 512 to sign on. In accordance with some aspects, directing the user to the single sign-on services site 512 occur at substantially the same time as the control is launched. At 514, the user 502 is presented with a single sign-on service sign in page 516 on their repair center client 504, just as if this is occurring only within the client environment. The user is provided the opportunity to register and/or log on.

Figure 6:
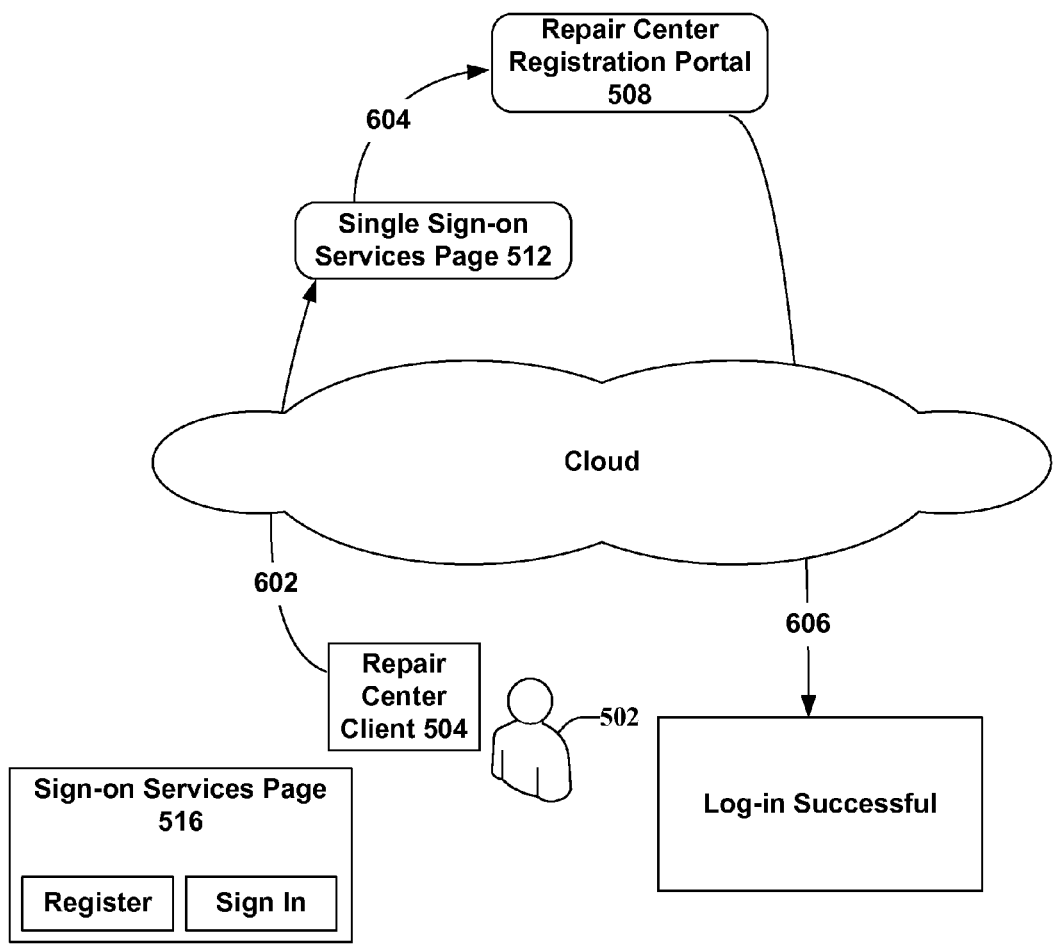
FIG. 6 illustrates a continuation of the non-limiting example of a simple for the lightweight authentication mechanism of FIG. 5, according to an aspect.

FIG. 6 illustrates a continuation of the non-limiting example of a simple for the lightweight authentication mechanism of FIG. 5, according to an aspect. The user 502 signs on (e.g., provides a single sign-on service identification), at 602, using his/her single sign-on id on repair center client 504. The single sign-on site authenticates the user 502, at 604. The single sign-in services site 512 notifies repair center registration portal 508 that logon was successful. The repair center registration portal 508 then informs user 502, at 606, that the single sign-on identification is successfully authenticated. The single sign-on service site will redirect the user 502 back to the Repair Center registration portal. The repair center registration portal acknowledges to the user 502 that authentication is completed.

Figure 7:
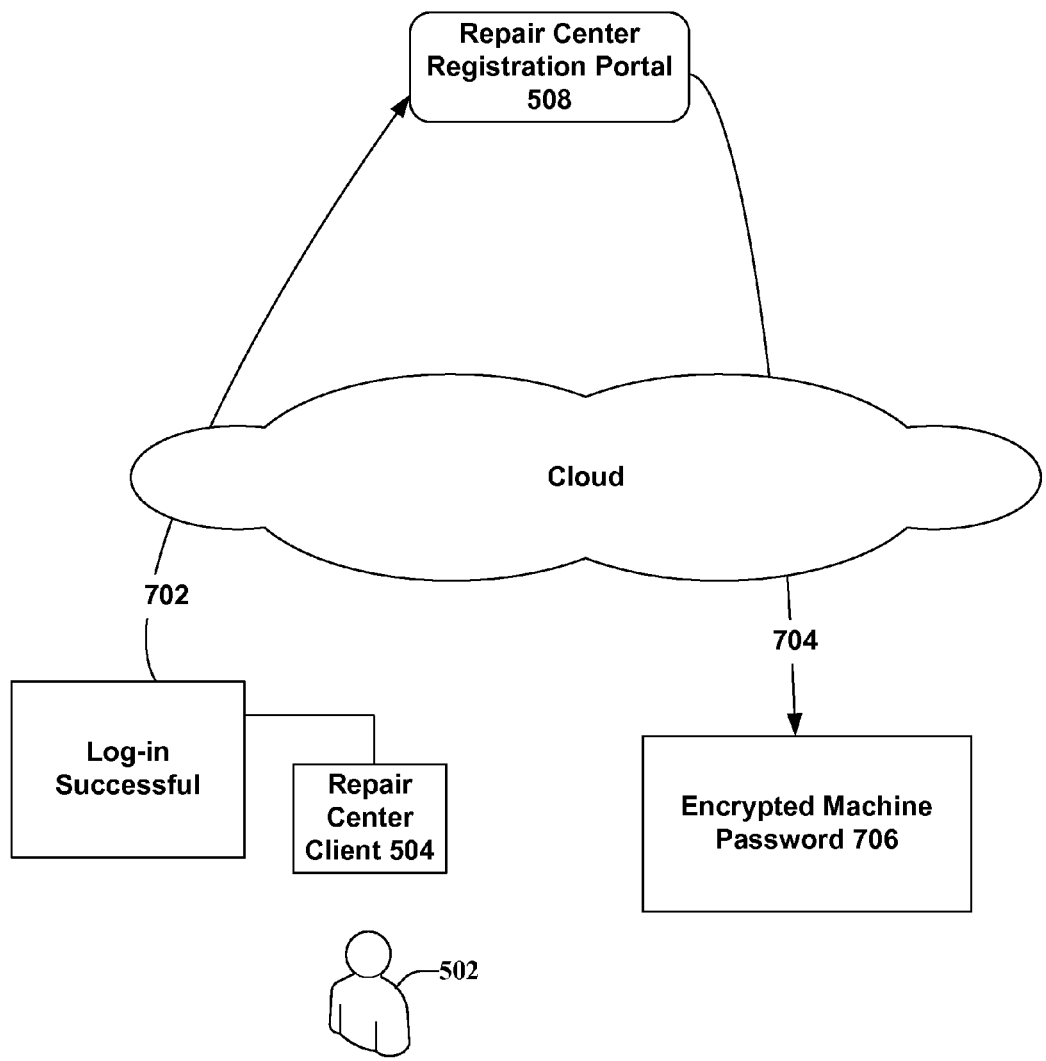
FIG. 7 illustrates a non-limiting example of a simple flow for sensitive data exchange using a lightweight authentication mechanism, according to an aspect.

FIG. 7 illustrates a non-limiting example of a simple flow for sensitive data exchange using a lightweight authentication mechanism, according to an aspect. A user 502 confirms a repair center account is to be created by selecting an "OK" button, for example. In accordance with some aspects, the user 502 registers for a repair center online account. The repair center registration portal generates a machine password and this password can be stored on the client machine.

In order to help ensure the sensitive data exchange is secure, repair center client 504 can generate a key pair using an RSA algorithm for each communication session, for example. The public key is posted to the server, at 702, through the SSL channel on the embedded web form on the client. In an example, repair center client 504 creates a key pair and posts the public key to the repair center registration portal 508.

Repair center registration portal 508 retrieves the public key, creates a machine password, and encrypts the machine password with the public key. Repair center registration portal 508 posts back, at 704, the encrypted machine password 706 to the Repair Center Client 504.

Figure 8:
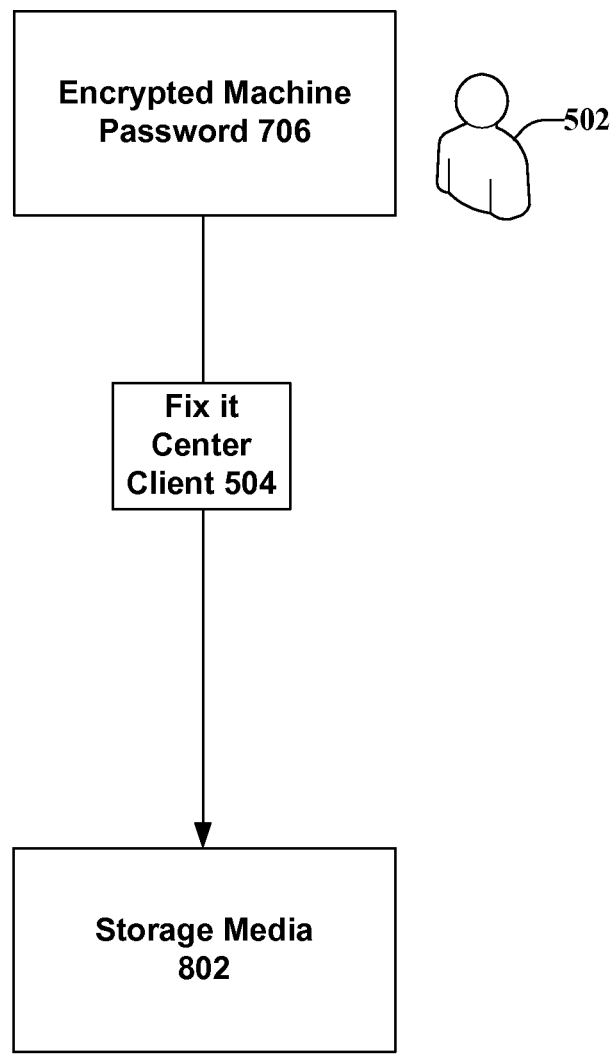
FIG. 8 illustrates a continuation of the non-limiting example of a simple flow for sensitive data exchange using the lightweight authentication mechanism of FIG. 7, according to an aspect.

FIG. 8 illustrates a continuation of the non-limiting example of a simple flow for sensitive data exchange using the lightweight authentication mechanism of FIG. 7, according to an aspect. As repair center registration portal receives the posted public key, repair center registration portal will generate a device password for the customer machine. The password is encrypted using the public key posted and return back to the repair center client through the embedded web form. In return, repair center client retrieves the encrypted password from the embedded web form, and then decrypts the password by using its own private key. The password is then stored inside a secure store. This mechanism helps to ensure the sensitive data is encrypted and transmitted through a secure channel. As shown, the repair center client 504 retrieves the encrypted password 706 and decrypts the encrypted password 706 with a private key of the repair center client 504. After decryption, the repair center client 504 stores the password inside a secure store 802.

Figure 9:
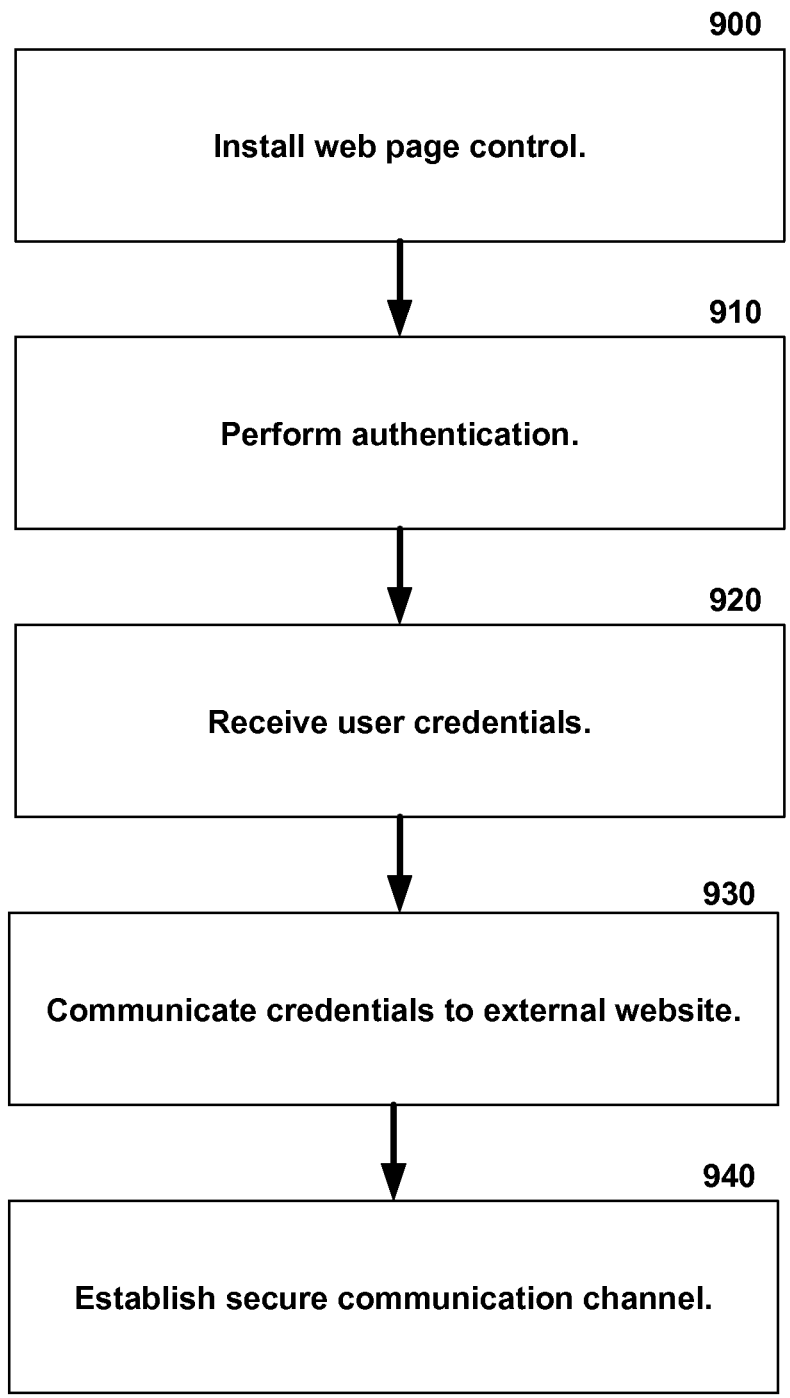
FIG. 9 is a flow diagram illustrating an exemplary non-liming process for authentication from a client side perspective, according to an aspect.

FIG. 9 is a flow diagram illustrating an exemplary non-liming process for authentication from a client side perspective, according to an aspect. At 900, a web page control is installed on a client device. In accordance with some aspects, the web page control is a portion of an external website. The web page control can be hosted on the rich client by the external website.

At 910, authentication with an external website is performed. The authentication can be performed through a portion of the external website hosted on an application executing on the rich client. In accordance with some aspects, the portion of the external website is displayed during the authentication.

At 920, user credentials are received. For example, the external website that is redirected to a single sign-on service identification can be displayed and a user interface created. The user interface can be configured to receive the credentials, which can be manually input by a user of rich device and/or obtained through other means (e.g., automatically by accessing storage).

The credentials are communicated to an external website, at 930. If the credentials provided match information retained by the external website, the authentication is successful and the portion of the external website displayed is collapsed (e.g., removed from view). If the credentials provided do not match information retained by the external website, the authentication is denied and an error message is received at the rich client.

If the authentication is successful, at 940, a secure communication is established with the external website. In an aspect, the secure communication can be established by scraping the external website to obtain a shared key.

Figure 10:
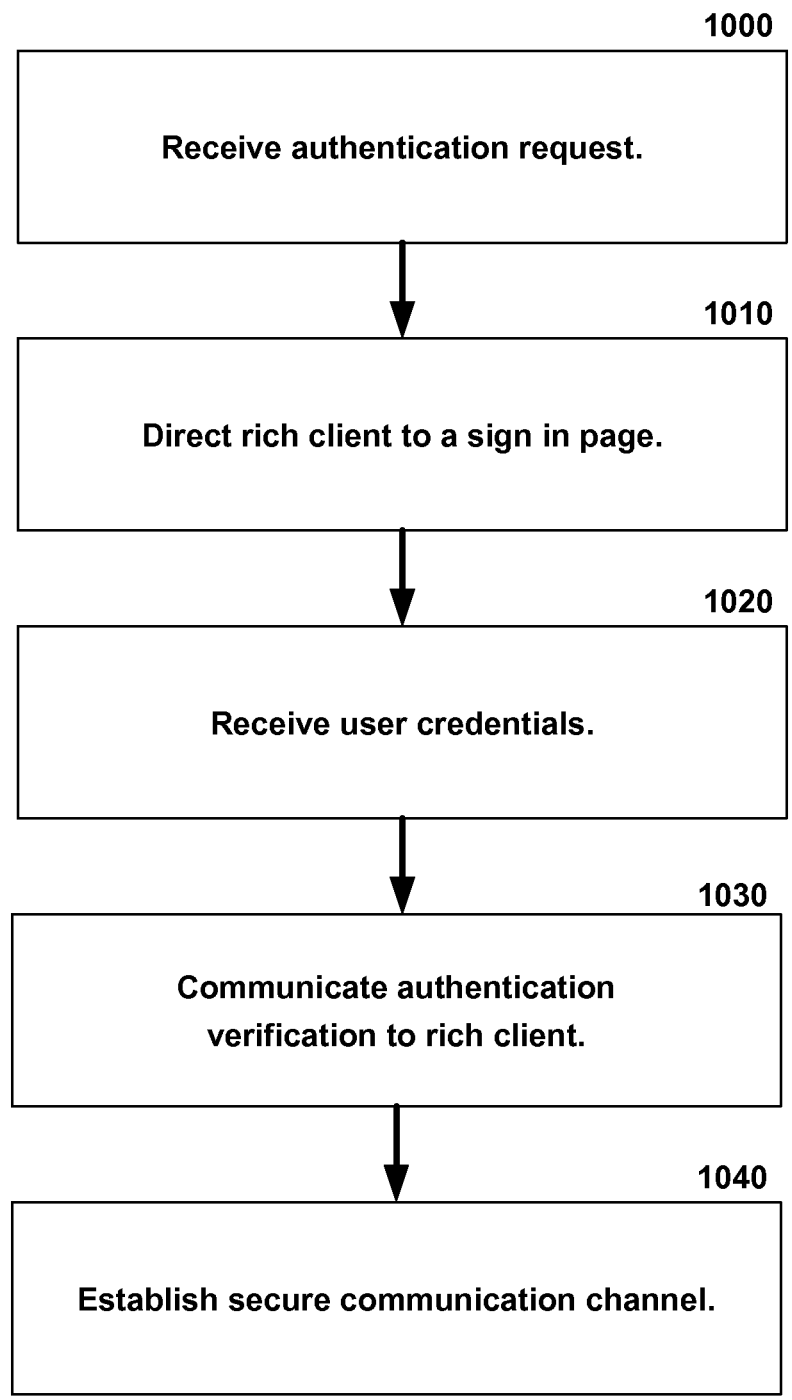
FIG. 10 is a flow diagram illustrating an exemplary non-liming process for authentication from a server side perspective, according to an aspect.

FIG. 10 is a flow diagram illustrating an exemplary non-liming process for authentication from a server side perspective, according to an aspect. At 1000, an authentication request is received from a rich client. At 1010, a notice is sent directing the rich client to a sign in page. For example, the direction to the sign in page can be facilitated by a portion of an external website hosted in at least one local application executing on the rich client. The sign in page is associated with a single sign-in service. At 1020, user credentials are received.

As a function of the user credentials, a determination whether the rich client is to be authenticated with the external website is determined. If the authentication is not allowed (e.g., credentials do not match), an error is provided to the rich client. If the authentication is allowed, at 1030, verification is communicated to the rich client.

At 1040, a secure communication channel is established with the rich client. The rich client can now communicate with the external website over the secure communication channel.

The disclosed aspects provide a light weight mechanism that not only mitigates a setup footprint of a rich client, but also enables easier testing and patching since most of the functions are performed on the server side. Since the application does not patch components related to the single sign-on service identification authentication on the client machines. In addition, switching between different environments has been made easier with the disclosed aspects since the change is only on the server, which allows applications to be switched automatically.

Exemplary Networked and Distributed Environments

One of ordinary skill in the art can appreciate that the various embodiments of the authentication systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the authentication and secure communication mechanisms as described for various embodiments of the subject disclosure.

Figure 11:
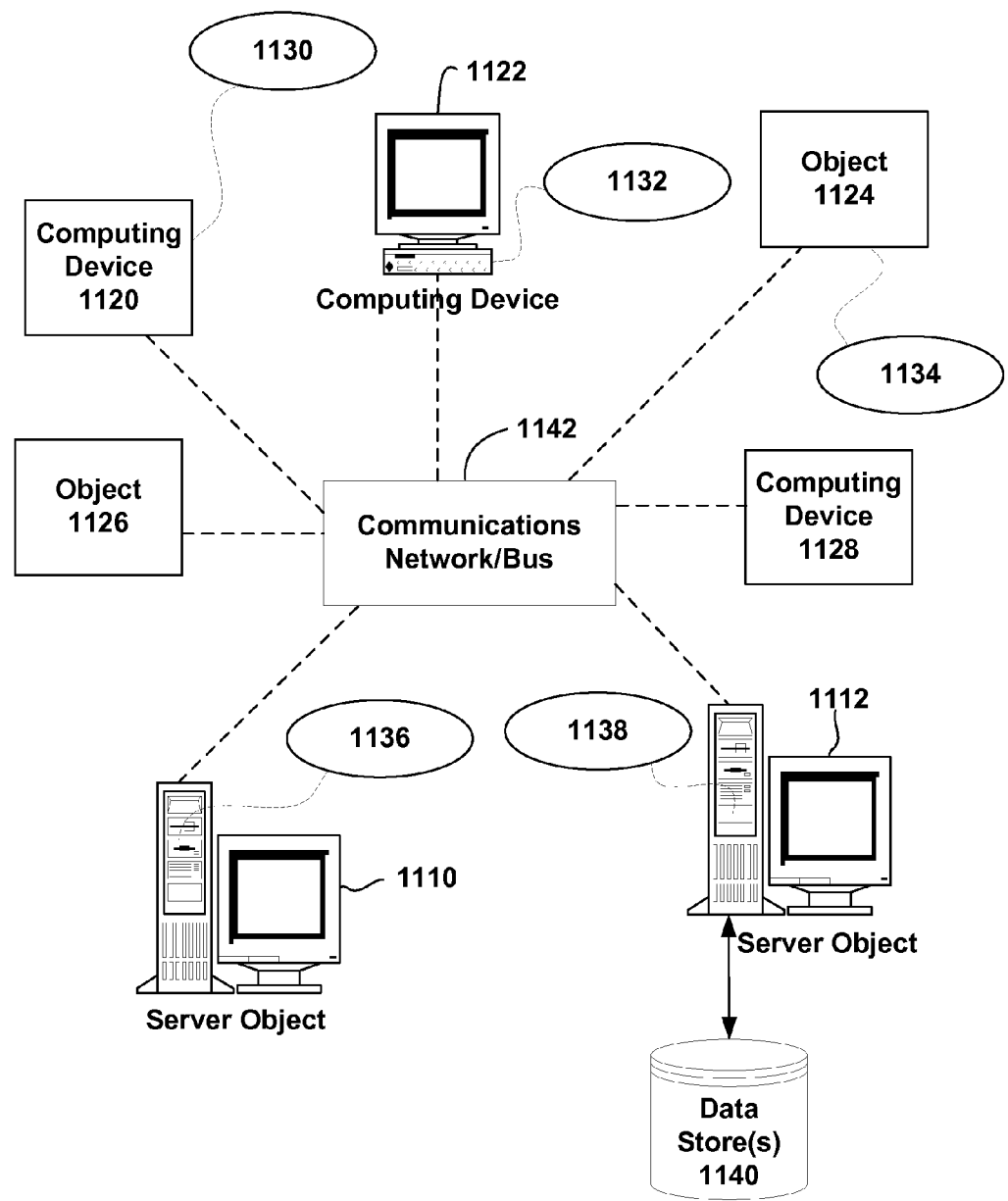
FIG. 11 is a block diagram representing exemplary non-limiting networked environments in which various embodiments described herein can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138 and data store(s) 1140. It can be appreciated that computing objects 1110, 1112, etc. and computing objects or devices 1120, 1122, 1124, 1126, 1128, etc. may comprise different devices, such as personal digital assistants (PDAs), audio/video devices, mobile phones, MP3 players, personal computers, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1142, either directly or indirectly. Even though illustrated as a single element in FIG. 11, communications network 1142 may comprise other computing objects and computing devices that provide services to the system of FIG. 11, and/or may represent multiple interconnected networks, which are not shown. Each computing object 1110, 1112, etc. or computing object or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the authentication and secure communication techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the authentication systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1142 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Exemplary Computing Device

As mentioned, advantageously, the techniques described herein can be applied to any device where it is desirable to perform authentication and secure communication in a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 12 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 12:
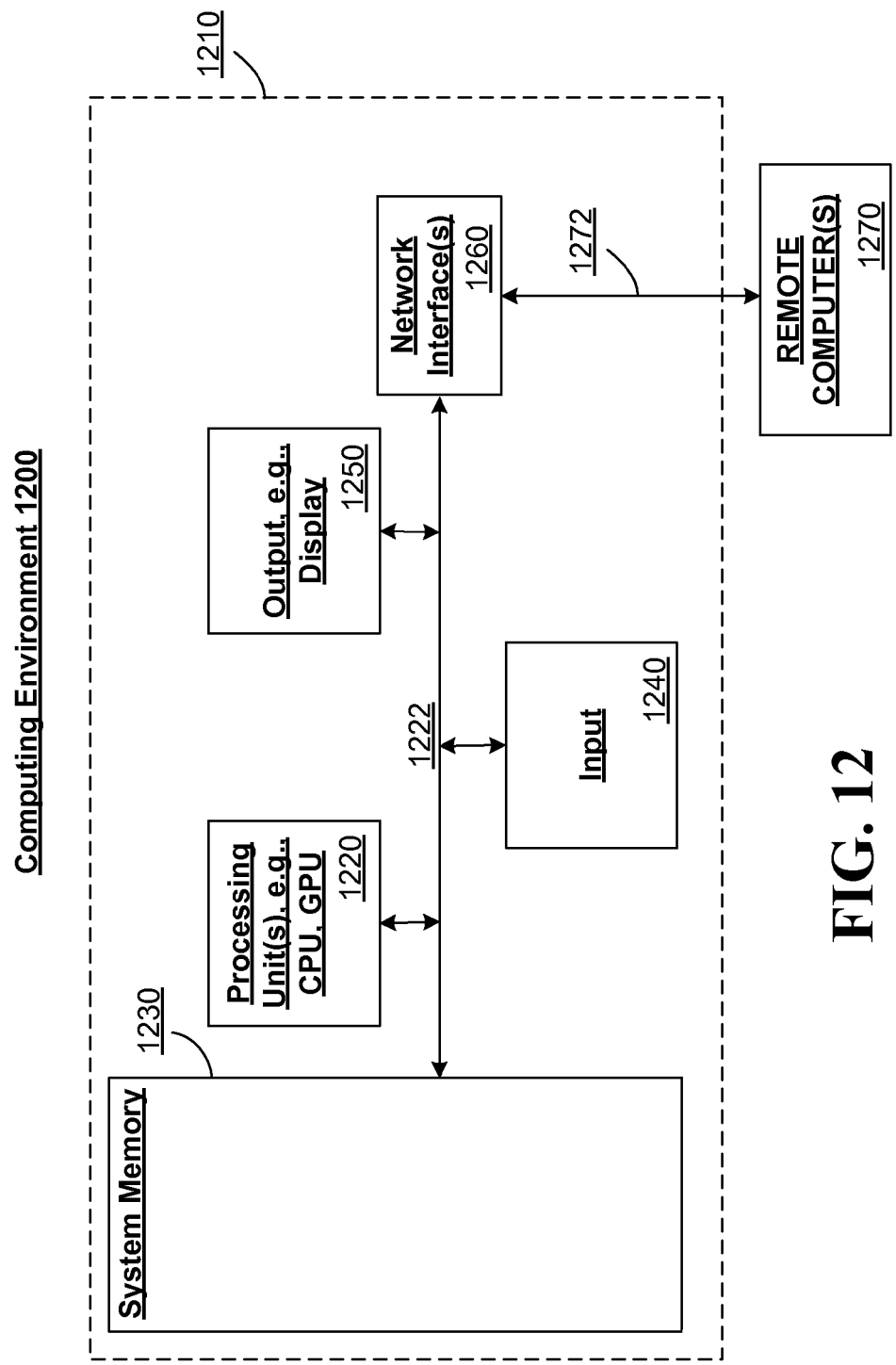
FIG. 12 is a block diagram representing an exemplary non-limiting computing system or operating environment in which one or more aspects of various embodiments described herein can be implemented.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither should the computing system environment 1200 be interpreted as having any dependency or requirement relating to any one or combination of components illustrated in the exemplary computing system environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, system memory 1230 may also include an operating system, application programs, other program modules, and program data. According to a further example, computer 1210 can also include a variety of other media (not shown), which can include, without limitation, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections, such as network interfaces 1260, to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

In addition, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:
1. An authentication system, comprising:
a rich client configured to execute one or more local applications; and
a control manager component configured to perform authentication with an external website, the authentication based on credential information obtained by the external website from another website to which the external website directs the rich client to establish authentication with a single sign-on service, the control manager component being associated with at least one of the one or more local applications, the authentication system configured to automatically switch from a first single sign-on application to a second single sign-on application.

2. The authentication system of claim 1, further comprising:
a session processing component configured to establish a secure session with the external website, wherein the secure session is established as a function of the authentication with the external website.

3. The authentication system of claim 1, further comprising:
a credential component configured to create a user interface configured to receive credentials, wherein the control manager component communicates the credentials to the external website for comparison with the credential information.

4. The authentication system of claim 1, wherein the control manager component is visible during the authentication with the external website and is collapsed after successful authentication.

5. The authentication system of claim 1, further comprising a session processing component configured to establish a secure communication session with the external website.

6. The authentication system of claim 1, further comprising a session processing component configured to scrape the external website to retrieve a shared key in response to a web page control authentication process.

7. The authentication system of claim 6, further comprising a communication component configured to exchange data with the external website using the shared key.

8. The authentication system of claim 1, wherein the control manager component is configured to perform the authentication with the external website with biometrics associated with a user of the rich client.

9. The authentication system of claim 1, the secure session is established through the use of a proxy approach.

10. An authentication system, comprising:
a host component that is remotely coupled to a rich client through a network such that the host component is not included in the rich client, the host component configured to host a portion of a single sign-on service in at least one application executing on the rich client; and
a verification processing component, implemented at least in part by hardware, configured to authenticate the rich client on the single sign-on service.

11. The authentication system of claim 10, wherein the host component is configured to direct the rich client to a website external to the rich client.

12. The authentication system of claim 11, further comprising an access manager component that receives a credential of the rich client from the website and selectively determines if the rich client can use at least one service of the single sign-on service.

13. The authentication system of claim 10, further comprising a security manager component configured to establish and maintain a secure communication channel with the rich client after authentication.

14. The authentication system of claim 13, wherein the security manager component performs a key pair exchange with the rich client to establish the secure communication channel.

15. The authentication system of claim 10, the verification processing component is configured to authenticate the rich client with biometrics of a user of the rich client.

16. A method of establishing a secure communication channel, comprising:
launching a control that embeds a web browser in an application executing on a rich client;
authenticating with an external website through a portion of the external website hosted on the application, the authenticating based on credential information obtained by the external website from another website to which the external website directs the rich client to establish authentication with a single sign-on service; and
establishing a secure session with the external website as a function of the authentication.

17. The method of claim 16, further comprising:
displaying the portion of the external website before the authenticating; and
collapsing the portion of the external website after the establishing.

18. The method of claim 16, further comprising;
displaying the external website that is redirected to a single sign-on service identification;
creating a user interface configured to receive credentials; and
communicating the credentials to the external website before the authenticating.

19. The method of claim 16, further comprising:
scraping the external website to obtain a shared key before the establishing.

20. The authentication system of claim 1, wherein the control manager component is further configured to provide an authentication request that requests authentication of the client; and
wherein the authentication system further comprises:
a verification processing component configured to determine whether the authentication of the client is to be allowed or not allowed.

* * * * *